United States Patent Office 3,415,465
Patented Dec. 10, 1968

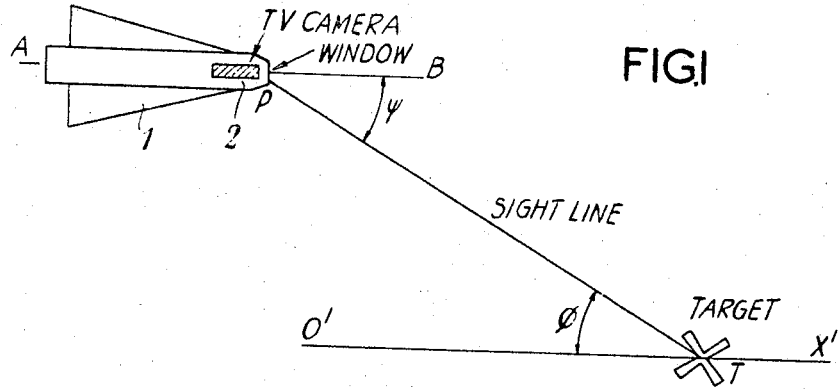
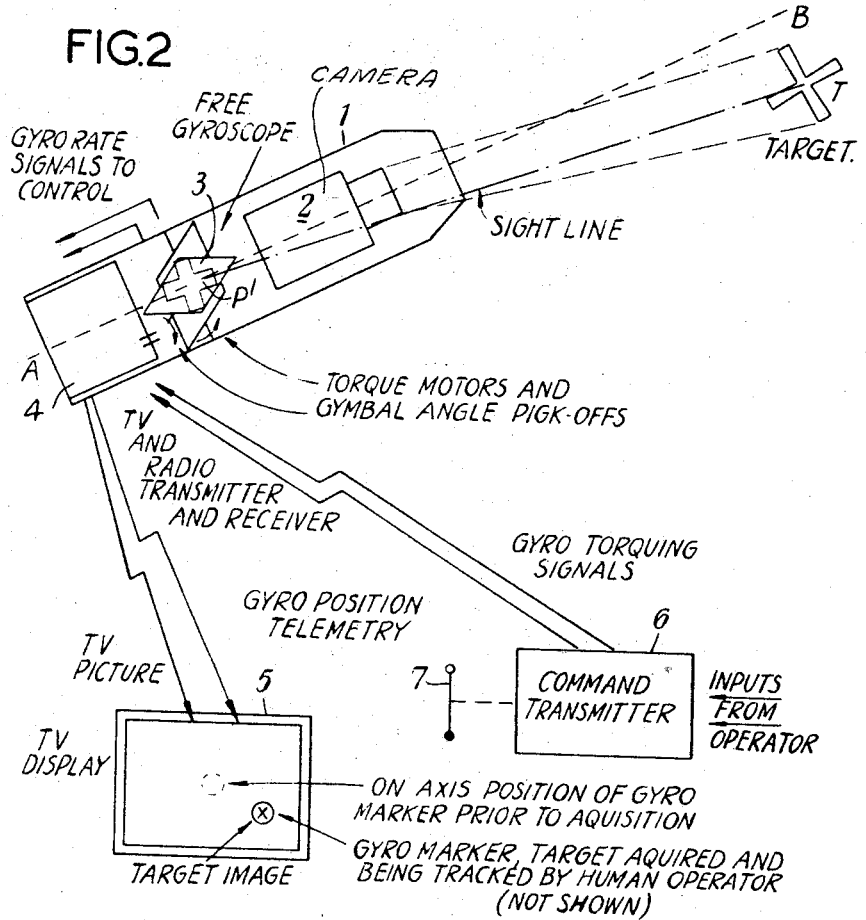

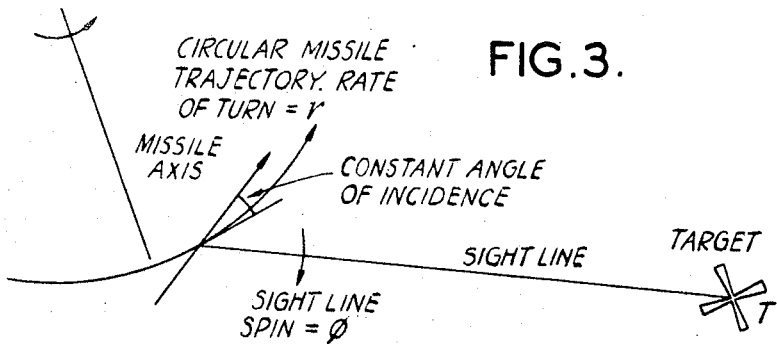
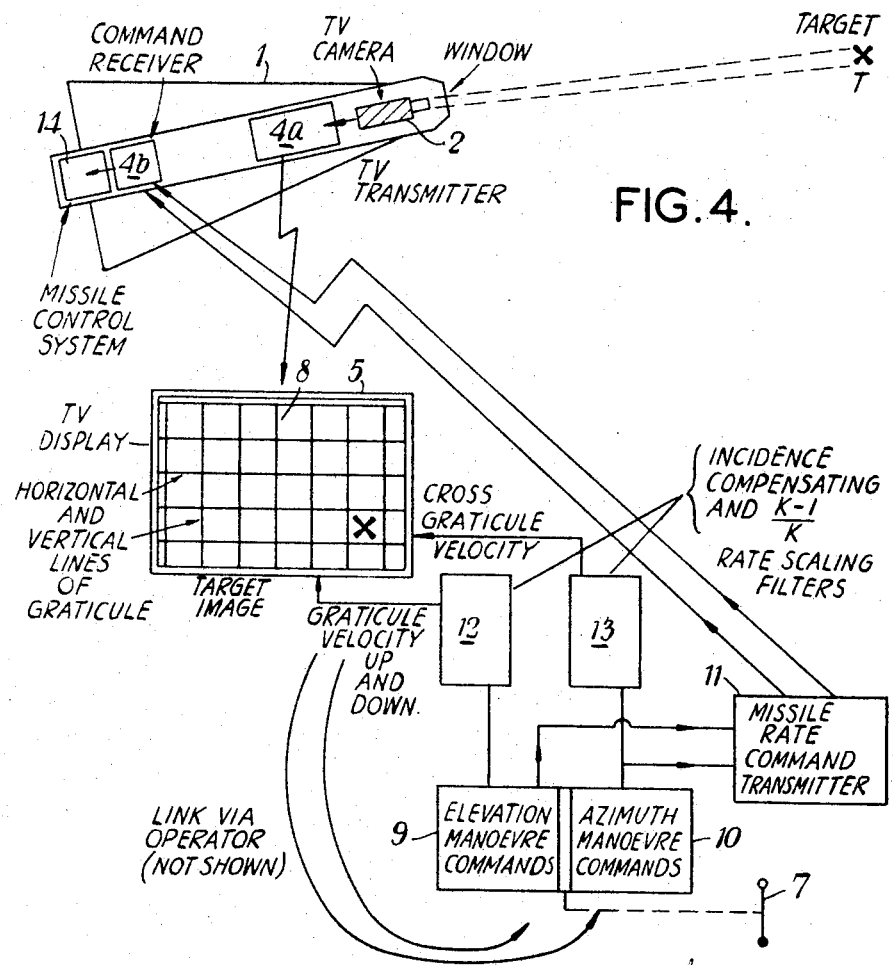

3,415,465
MISSILE CONTROL SYSTEM WITH A REMOTE DISPLAY OF MISSILE AND TARGET FOR OBTAINING CONTROL SIGNALS
Alan Bedford, Hatfield, England, assignor to Hawker Siddeley Dynamics Limited, Hatfield, England, a company of Great Britain
Filed Mar. 20, 1964, Ser. No. 353,651
Claims priority, application Great Britain, Mar. 22, 1963, 11,570/63
5 Claims. (Cl. 244—3.14)

This invention relates to homing systems for guiding a moving body towards a target and is of particular, but not exclusive, application to missile guidance systems. The term "missile" is used herein in its generic sense and includes, in addition to missiles which are launched into space towards a target which may be stationary or moving, other forms of missiles such as, for example, torpedoes. The invention is also of application to, for example, aircraft which may be homed on to a runway.

Guided missiles which are launched into space are commonly provided with a target sensing and locating device having a relatively narrow field of view, which device is displaceable about axes in the missile and is required to follow the target, usually under gyroscopic control, and keep it within its field of view. The small angle of the field of view of such a device is a disadvantage which is inherent in such a system, and a further disadvantage is the friction torques which occur in the bearings in which the device must be mounted for displacement. Such friction torques occur even when highly expensive bearings are employed and result, not only in a loss of sensitivity, but also in a tendency for the device and the missile guidance system to hunt when tracking the target. Further, in those cases where the missile is under the remote control of an operator presented with the data necessary to control the missile, the operator may inadvertently transmit an erroneous command signal to the missile and, realising his mistake from the data presented to him, transmit further command signals to correct the error; such an operator usually over-corrects or under-corrects for the error, at least initially, with the result that the missile path is far from optimum.

It is an object of the present invention to provide an improved homing system for guiding a moving body toward a target, which system shall not be subject to the disadvantages referred to, at least to the same extent as known systems.

According to the present invention, a homing system for guiding a moving body towards a target comprises means for deriving a target signal as a function of target position relative to an axis of the body, means for deriving a reference signal as a predetermined function of the target signal, and means for deriving a body control signal as a function of the rate of change of the reference signal.

Some embodiments of the invention will now be described by way of example, reference being made to the accompanying drawings in which:

FIGURE 1 is an explanatory diagram;
FIGURE 2 is a diagrammatic representation of a system according to the invention;
FIGURE 3 is a further explanatory diagram, and
FIGURE 4 is a diagrammatic representation of another system according to the invention.

In FIGURE 1 there is shown a missile 1 carrying target-detecting device in the form of a television camera 2 which is fixed relatively to the missile. The camera 2 points forwardly of the missile 1 and has a relatively large viewing angle (theoretically large enough to accommodate aiming errors) about an axis AB which is fixed relative to an axis of the missile and which specifically, in this example, is coincident with the longitudinal axis of the missile. A target T is shown lying on a fixed space axis O'X'.

The target-detecting device need not necessarily be the television camera 2, but may be any suitable device fixed relatively to the missile and having a wide viewing angle and it may, for example, be a radar system with a suitable aerial or an optical telescope or any equivalent means. It will, however, simply be referred to herein as a camera.

When the missile axis AB is pointed in a direction parallel to the space axis O'X', the sight line PT from the camera 2 to the target makes an angle $\psi$ with the axis AB and an angle $\phi$ with the space axis O'X' and, as these angles are equal, the rates of change with time of these angles are also equal, i.e. $\dot{\phi}=\dot{\psi}$. The parameter $\phi$ is usually referred to as the "sight-line spin" and is important in guidance systems operating on the principle of proportional navigation in which the missile is required to have a rate of turn $r$ proportional to the rate of turn of the sight line PT, so that $r=K\dot{\phi}$ where K is a constant.

Although $\psi$ can be ascertained from the system it will be apparent that the equality of $\psi$ and $\phi$ will be destroyed by any missile manoeuvre, whether this is due to flight-path turn in space or to variations, about a pitching axis of the missile, of the angle of incidence discussed below with reference to FIGURE 3.

In order to detect the sight-line spin $\dot{\phi}$ it is necessary to provide a reference datum which is not fixed relative to the missile axis, so that $\dot{\phi}$ can be measured. This is achieved in the system illustrated in FIGURE 2 by providing a free gyroscope 3 in the missile which is arranged, when the target has been "acquired" as described below, to define a sight line P'T from the gyroscope to the target, the camera axis AB being fixed. P' lies on the axis AB. The missile incorporates a wireless transmitter-receiver 4 arranged to transmit wireless signals which represent the angular position of the target T relative to the axis AB and signals which represent the angular inclination of the gyroscope axis relative to the axis AB. The transmitter-receiver 4 also receives wireless command signals controlling the precession of the gyroscope 3 and the heading of the missile.

At some location remote from the missile 1, e.g. in an aircraft or on the ground, there is provided a screen 5, for example a cathode-ray tube, upon which, in response to the wireless signals transmitted by the transmitter-receiver 4, appear two traces, respectively illustrated in the form of a cross X and a circle O. The cross X and the circle O constitute markers and respectively represent, by their position on the screen 5, the angular position of the target T relative to the axis AB, and the angular inclination of the gyroscope axis relative to the axis AB. There is also provided a wireless transmitter 6 for sending command signals to the transmitter-receiver 4 of the missile, under the control of a manually operable joy-stick 7.

In the operation of the system described with reference to FIGURE 2, assuming that the missile is fired and that the target T is within the field of view of the camera 2, signals representing the angular position of the target T relative to the axis AB will be transmitted by the transmitter-receiver 4 and will be utilised to represent the angular position of the target, as by the position of the cross X on the screen 5. Assuming that, at this stage, the axis of the gyroscope 3 is not yet aligned with the sight line P'T but is aligned with the axis AB, a signal will be transmitted by the transmitter-receiver 4 representing the angular inclination of the gyroscope axis relative to the axis AB and will initially be utilised to represent this position on the screen 5 in the form of the central circle O shown in broken lines.

The operator now has to acquire the target, and does this by displacing the joy-stick 7 to send command signals via the transmitter 6 to the transmitter-receiver 4 to cause the gyroscope 3 to precess until the gyroscope axis lies along the sight line P′T and intersects the target. The precession of the gyroscope 3 is sensed by means not shown, and corresponding signals are transmitted by the transmitter-receiver 4 to correspondingly displace the circle O on the screen 5. When the circle O surrounds the target marker X on the screen 5 the operator knows that the target lies on the gyroscope axis, the gyroscope axis now lying along the sight line P′T, and the acquisition phase is completed. Conventional techniques employed for mixing the outputs of two television cameras to form a single transmitted signal may be employed at the receiving end of the system to achieve the marker superposition or, alternatively, can be used in the missile, in which case a separate wireless link can be eliminated.

Having thus acquired the target, the operator is now required to track the target T, by operation of the joy-stick 7 so as to maintain the marker represented by the circle O around, and thus in coincidence with, the target image X. This may involve further precession of the gyroscope 3, and the rate of such precession of the gyroscope is detected by conventional means such as, for example, by measuring the current in the torque motors used to precess the gyroscope. The signal so obtained represents the rate of precession of the gyroscope 3, and hence is proportional to the required sight-line spin $\dot{\phi}$, and is supplied to the missile control system (which may be of a conventional kind), to cause the missile to navigate to the target.

It will be noted that if, during the manoeuvres, the missile body pitches, the target position will move, in the field of view of the camera 2, and hence will move correspondingly on the display screen 5. Further, as the gyroscope stabilises its own position in space, its position marker O will move in an identical manner so that, providing the target has been originally acquired correctly, the gyroscope marker O will tend to remain on the target image X regardless of manoeuvres. This is of considerable assistance to the operator in tracking the target. Furthermore, any incorrect command signals erroneously transmitted by the operator will result both in precession of the gyroscope 3 and in a corresponding change in the attitude of the missile and hence of the axis AB, so that the gyroscope marker O and the target image X will tend to move in unison on the screen 5 and thus tend to remain in coincidence, so that no abrupt corrective action may be required by the operator.

It will be observed that the system described with reefrence to FIGURE 2 effectively derives a target signal as a function of the target position relative to the axis AB, as the target image X takes up a corresponding position on the screen 5. By bringing the gyroscope marker O into coincidence with the target image X, a reference signal is effectively produced as a function of the target signal, and by maintaining the gyroscope marker O in coincidence with the target image X, a control signal is generated as a function of the rate of change of this reference signal, the control signal being utilised to control the attitude of the missile.

It will be apparent that the use of a fixed camera 2 eliminates the requirement for bearings for such a camera and considerably simplifies the construction of the missile guidance system.

In the system illustrated in FIGURE 4, the gyroscope 3 is omitted and is effectively replaced at the receiving end of the system by a graticule 8 on the screen 5, the graticule 8 being conveniently, but not necessarily, generated electronically and being displaceable with respect to both horizontal and vertical axes as seen in FIGURE 4, at a velocity controlled by the joy-stick 7. Operation of the joy-stick 7 is arranged to control both an elevation-manoeuvre command unit 9 and an azimuth-manoeuvre command unit 10, these units being arranged to generate corresponding command signals which are supplied both to a missile-rate command transmitter 11 and also to units 12 and 13 which respectively command the velocity of displacement of the graticule 8 across the screen 5 with respect to the two axes referred to. In FIGURE 4, the wireless transmitter-receiver 4 of the previous example is replaced by a wireless transmitter 4a which transmits a signal representing the position of the target T relative to the axis AB, and by a wireless command receiver 4b which receives the missile-rate command signals from the transmitter 11 and feeds these signals to the missile control system denoted by the block 14.

In the operation of the system illustrated in FIGURE 4, no acquisition phase is required, as the target position is denoted by the target image X on the screen 5 and the operator identifies this with that square of the graticule 8 in which the target image X appears. The operator displaces the joy-stick 7 so as to maintain the selected square of the graticule 8 around the target image X and, in so doing, generates corresponding signals which are transmitted to the missile to demand a manoeuvre therefrom. When the target is being tracked correctly, the target image X will appear to remain stationary with respect to the graticule 8 so that a datum independent of the missile and therefore of the axis AB has been introduced, by requiring the operator to match the target and the graticule velocities independently of the target position in the display.

Referring to FIGURE 3, it will be seen that if the missile speed and hence the angle of incidence is constant, then the angular velocity of the target T with respect to the camera axis AB will be $r-\dot{\varphi}$. If the operator is tracking correctly and the velocity impressed on the graticule 8 by the system is $$\frac{(K-1)r}{K}$$

then $$\frac{(K-1)r}{K} = r - \dot{\phi}$$

i.e. $r = K\dot{\phi}$, which is the correct proportional navigation law, K being the constant referred to above.

Correspondingly, either the sight-line spin or the flight-patch turn can be deduced from a knowledge of K or $K-1/K$, and of the graticule rate.

Changes of the angle of incidence which occur during the manoeuvres are due to commands fed into the system by the operator and so are, in principle, known at the receiving end of the system; compensating signals to cause the graticule 8 to follow such incidence variations are applied to the display. In consequence, the target marker X and gaticule 8 will move together during incidence variations, in the same manner as the target marker X and the gyroscope marker O move together in the system described with reference to FIGURE 2.

The exact compensating filter transfer function necessary to the system and defining K may vary from application to application because that function is intimately related to the transfer function between demand and achieved rate for each particular missile, but the choice of a suitable filter does not present any problems. Such filters are embodied in units 12 and 13.

It will be appreciated that the system described with reference to FIGURE 4 operates substantially in the same manner as that described with reference to FIGURE 2, except that the function of the gyroscope 3 in the latter system is replaced by equipment at the receiving end of the system performing similar functions. The system of FIGURE 4 thus has the advantage that the cost of the missile can be materially reduced.

In a modification of the invention described with reference to FIGURES 2 and 4, apparatus according to the invention is employed to guide a moving body towards a target, for example to home an aircraft on to a runway. In such a case, all of the apparatus may be carried by the moving body; thus, in the case of FIGURE 2, the body 1 carries the screen 5, and the joy-stick 7 (which is operated by the pilot carried by the moving body 1): evidently, in such a case, the wireless links may be omitted.

In a further modification of the invention, it is visualised that manual operation of the joy-stick 7 may be dispensed with, and any suitable automatic arrangement employed to cause a movable element to follow, similarly to the gyroscope marker O or the graticule 8, the movement of the target image X.

I claim:
1. A homing system for guiding a moving body towards a target, the homing system including a target-detecting device carried by the moving body and fixed relatively to an axis of the moving body and arranged to generate a first signal representing the angular inclination of the target relatively to the said fixed axis, display apparatus having a display face and arranged to receive the first signal and in response to display upon the display face a mark the position of which upon the display face represents the angular inclination of the target relatively to the said axis, movable means movable over the display face, control means capable of being changed in position to control the movement of the movable means over the display face so as to maintain a predetermined relationship of the positions, relatively to the display face, of the said mark and of the movable means, and generating means responsive to the rate of change with time of the position of the control means to generate a control signal for the moving body, said control means including a gyroscope carried by the moving body and arranged to generate a second signal representing the angular inclination of the axis of the gyroscope relatively to the said axis of the moving body, the control means being arranged to control the movement of the movable means over the display face in response to the said second signal, whereby the position of the movable means relatively to the display face represents the angular inclination of the axis of the gyroscope relatively to the said axis of the moving body.

2. A system according to claim 1, wherein the control means includes means for altering the angular inclination of the axis of the gyroscope relatively to a fixed line in space, in response to the position of the said mark upon the display face.

3. A system according to claim 1, in which the generating means is responsive to the rate of change with time of the angular inclination of the axis of the gyroscope relatively to a fixed line in space.

4. A homing system for guiding a moving body towards a target, the homing system including a target-detecting device carried by the moving body and fixed relatively to the moving body and arranged to generate a first signal representing the angular inclination of the target relatively to the said fixed axis, display apparatus having a display face and arranged to receive the first signal and in response to display upon the display face a first mark the position of which upon the display face represents the angular inclination of the target relatively to the said fixed axis, a gyroscope carried by the moving body and having a gyroscope axis the angular position of which, relatively to a fixed direction in space, can be varied, the gyroscope being arranged to generate a second signal representing the angular inclination of the gyroscope axis relatively to the said fixed axis, and the gyroscope being arranged to generate a control signal which is a function of the rate of change with time of the angular inclination of the gyroscope axis relatively to the said fixed direction in space, the display apparatus being also arranged to receive the second signal and in response to display upon the display face a second mark the position of which upon the display face represents the angular inclination of the gyroscope axis relatively to the said fixed axis, the homing system also including a manually operable control lever movable in response to the position of the said first mark upon the display face to change the angular position of the gyroscope axis relatively to the said fixed direction in space and to thereby cause the said second mark to move over the display face to maintain a predetermined relationship of the positions, upon the display face, of the said first and second marks.

5. A system according to claim 4, wherein the gyroscope is carried by the moving body, and the display apparatus and the control lever are at a location remote from the moving body, the homing system including two wireless links between the moving body and the said remote location, one of the wireless links being arranged to transmit the said first and second signals from the moving body to the display apparatus, and the other of the wireless links being arranged to transmit signals from the control lever to the gyroscope to change the angular position of the gyroscope axis relatively to the said fixed direction in space.

References Cited

UNITED STATES PATENTS

| | | |
|---|---|---|
| 2,616,031 | 10/1952 | Nosker. |
| 2,649,262 | 8/1953 | Fahrney _____ 244—14.5 X |
| 2,906,916 | 9/1959 | Palmer. |
| 2,955,777 | 10/1960 | Null et al. _____ 244—14 |

RODNEY D. BENNETT, *Primary Examiner.*

M. F. HUBLER, *Assistant Examiner.*